United States Patent
Shao

(10) Patent No.: US 9,491,151 B2
(45) Date of Patent: Nov. 8, 2016

(54) MEMORY APPARATUS, CHARGE PUMP CIRCUIT AND VOLTAGE PUMPING METHOD THEREOF

(71) Applicant: eMemory Technology Inc., Hsinchu (TW)

(72) Inventor: Chi-Yi Shao, Taichung (TW)

(73) Assignee: eMemory Technology Inc., Hsinchu (TW)

( * ) Notice: Subject to any disclaimer, the term of this patent is extended or adjusted under 35 U.S.C. 154(b) by 0 days.

(21) Appl. No.: 14/944,228

(22) Filed: Nov. 18, 2015

(65) Prior Publication Data

US 2016/0197550 A1 Jul. 7, 2016

Related U.S. Application Data

(60) Provisional application No. 62/100,485, filed on Jan. 7, 2015.

(51) Int. Cl.

| | |
|---|---|
| *H03L 7/06* | (2006.01) |
| *H04L 29/06* | (2006.01) |
| *H02M 3/07* | (2006.01) |
| *H03K 3/012* | (2006.01) |
| *H03K 5/159* | (2006.01) |
| *H03K 17/687* | (2006.01) |
| *G11C 5/14* | (2006.01) |
| *H03K 5/151* | (2006.01) |
| *H03K 5/00* | (2006.01) |

(52) U.S. Cl.
CPC .......... *H04L 63/0457* (2013.01); *G11C 5/145* (2013.01); *G11C 5/147* (2013.01); *H02M 3/07* (2013.01); *H02M 3/073* (2013.01); *H03K 3/012* (2013.01); *H03K 5/159* (2013.01); *H03K 5/1515* (2013.01); *H03K 17/687* (2013.01); *H04L 63/0861* (2013.01); *H02M 2003/075* (2013.01); *H03K 2005/00019* (2013.01)

(58) Field of Classification Search
CPC ... H04L 63/0457; H02M 3/07; H03K 3/012; H03K 5/159; H03K 17/687
USPC .......................... 327/536, 149, 148, 157, 158
See application file for complete search history.

(56) References Cited

U.S. PATENT DOCUMENTS

| | | | | |
|---|---|---|---|---|
| 5,760,497 | A | * | 6/1998 | Pascucci ............... H02M 3/073 307/110 |
| 5,793,246 | A | * | 8/1998 | Vest ........................ G11C 5/145 307/110 |
| 5,793,679 | A | * | 8/1998 | Caser ..................... G11C 16/12 365/185.27 |
| 5,818,288 | A | * | 10/1998 | Le ............................ G05F 3/205 307/110 |
| 5,818,289 | A | * | 10/1998 | Chevallier ............ H02M 3/073 327/536 |
| 6,100,752 | A | | 8/2000 | Lee et al. |

(Continued)

*Primary Examiner* — Viet Q Nguyen
(74) *Attorney, Agent, or Firm* — Jianq Chyun IP Office

(57) ABSTRACT

The invention provides a memory apparatus, a charge pump circuit, and a voltage pumping method thereof. The charge pump circuit including a plurality of delay units, a latch circuit, and a plurality of charge pump units. The delay units respectively generate a plurality clock signals according to an output clock signal. The latch circuit receive a final stage clock signal of the clock signals and a latch enable signal. The latch circuit decides whether to latch final stage clock signal or not to generate the output clock signal according to the latch enable signal. The first stage of the charge pump unit receives an input voltage, and the charge pump units operate a voltage pumping operation on the input voltage to generate an output voltage according to the clock signals and the output clock signal.

14 Claims, 6 Drawing Sheets

(56) References Cited

U.S. PATENT DOCUMENTS

| | | | | |
|---|---|---|---|---|
| 6,151,229 A * | 11/2000 | Taub | | H02M 3/073 |
| | | | | 327/536 |
| 6,272,670 B1 * | 8/2001 | Van Myers | | G11C 5/145 |
| | | | | 327/536 |
| 6,292,048 B1 * | 9/2001 | Li | | H02M 3/073 |
| | | | | 327/536 |
| 6,337,595 B1 * | 1/2002 | Hsu | | G05F 3/265 |
| | | | | 323/314 |
| 6,344,959 B1 * | 2/2002 | Milazzo | | H02M 3/073 |
| | | | | 361/115 |
| 6,404,271 B2 * | 6/2002 | Ayres | | H02M 3/073 |
| | | | | 327/536 |
| 6,486,728 B2 | 11/2002 | Kleveland | | |
| 6,549,474 B2 | 4/2003 | Liu | | |
| 6,650,172 B1 * | 11/2003 | Shingyouchi | | H02M 3/073 |
| | | | | 327/536 |
| 6,664,846 B1 * | 12/2003 | Maung | | H02M 3/073 |
| | | | | 327/536 |
| 7,499,346 B2 * | 3/2009 | Kang | | G11C 5/145 |
| | | | | 365/185.18 |
| RE41,217 E * | 4/2010 | Ganesan | | H02M 3/073 |
| | | | | 327/536 |
| 7,995,364 B2 * | 8/2011 | Shiu | | H02M 3/07 |
| | | | | 363/124 |
| 8,040,741 B2 * | 10/2011 | Sato | | G11C 16/30 |
| | | | | 365/189.09 |
| 8,497,670 B1 * | 7/2013 | Molin | | H02M 3/07 |
| | | | | 323/293 |
| 8,508,287 B2 * | 8/2013 | Kern | | H02M 3/073 |
| | | | | 327/536 |
| 8,817,501 B1 * | 8/2014 | Low | | H02M 3/07 |
| | | | | 363/59 |
| 9,041,459 B2 * | 5/2015 | Szczeszynski | | G05F 3/02 |
| | | | | 327/536 |
| 9,081,399 B2 * | 7/2015 | Molin | | G05F 1/10 |
| 2001/0011919 A1 * | 8/2001 | Tanimoto | | H02M 3/073 |
| | | | | 327/536 |
| 2012/0087420 A1 * | 4/2012 | Kim | | H03K 5/135 |
| | | | | 375/259 |
| 2014/0009136 A1 | 1/2014 | Molin et al. | | |

* cited by examiner

MEMORY APPARATUS, CHARGE PUMP CIRCUIT AND VOLTAGE PUMPING METHOD THEREOF

CROSS-REFERENCE TO RELATED APPLICATION

This application claims the priority benefits of U.S. provisional application Ser. No. 62/100,485, filed on Jan. 7, 2015. The entirety of the above-mentioned patent application is hereby incorporated by reference herein and made a part of this specification.

BACKGROUND

1. Field of the Invention

The invention relates to a charge pump circuit and voltage pumping method thereof of a memory apparatus. Particularly, the invention relates to the charge pump circuit and the voltage pumping method thereof for generating a programming voltage and/or an erasing voltage for the memory apparatus.

2. Description of Related Art

In recently, non-volatile memory apparatuses are getting popular in electronic apparatuses. For providing a programming voltage and an erasing voltage in a non-volatile memory apparatus, in conventional art, a charge pump circuit is needed in the non-volatile memory apparatus.

In some conventional art, the charge pump circuit is disposed by a plurality of charge pump units, and the charge pump units pump up an input voltage in sequence to generate an output voltage. The charge pump units operate voltage pumping operation based on respective corresponding clock signals. When the voltage pumping operation has been finished, the clock signals should be stopped. If the conventional charge pump circuit can't stop the clock signals in time, unnecessary clock pulses are transmitted to the charge pump units, and an un-wanted ripple on the output voltage is generated. Furthermore, when the charge pump circuit is restarted again, a delay time of the charge pump unit chain for re-generating the output voltage is necessary, and the output voltage is reduced during the delay time, and another ripple on the output voltage is generated. That is, in conventional art, there are more ripple and peak current of the charge pump circuit, and performance of the output voltage is reduced.

SUMMARY OF THE INVENTION

The invention is directed to a charge pump circuit and a voltage pumping method for generating output voltage with reduced output ripple and reduced peak current.

The invention is also directed to a memory apparatus having the charge pump circuit. The charge pump circuit is used to provide a programming voltage and/or an erasing voltage with reduced output ripple and reduced peak current.

The present disclosure provides the charge pump circuit including a plurality of delay units, a latch circuit, and a plurality of charge pump units. The delay units are coupled in series, and the delay units respectively generate a plurality clock signals according to an output clock signal. The latch circuit is coupled to the delay units, and receive a final stage clock signal of the clock signals and a latch enable signal. The latch circuit decides whether to latch final stage clock signal or not to generate the output clock signal according to the latch enable signal. The charge pump units are coupled in series, wherein a first stage of the charge pump unit receives an input voltage, and the charge pump units operate a voltage pumping operation on the input voltage to generate an output voltage according to the clock signals and the output clock signal.

The present disclosure also provides the memory apparatus including a charge pump circuit. The charge pump circuit provides at least one of a programming voltage and an erasing voltage to a plurality of memory cell of the memory apparatus. The charge pump circuit includes a plurality of delay units, a latch circuit, and a plurality of charge pump units. The delay units are coupled in series, and the delay units respectively generate a plurality clock signals according to an output clock signal. The latch circuit is coupled to the delay units, and receive a final stage clock signal of the clock signals and a latch enable signal. The latch circuit decides whether to latch final stage clock signal or not to generate the output clock signal according to the latch enable signal. The charge pump units are coupled in series, wherein a first stage of the charge pump unit receives an input voltage, and the charge pump units operate a voltage pumping operation on the input voltage to generate an output voltage according to the clock signals and the output clock signal. Wherein the output voltage is used to be at least one of the programming voltage and the erasing voltage.

The present disclosure further provides a voltage pumping method. The voltage pumping method includes: generating a plurality of clock signals by delaying a output clock signal in sequence; receiving an input voltage, and operating a voltage pumping operation on the input voltage to generate an output voltage according to the clock signals and the output clock signal; and, latching a voltage level of a final stage clock signal of the clock signals to generate the output clock signal when a voltage level of the output voltage reaching a voltage level of a reference voltage.

According to the above descriptions, the present disclosure provides a charge pump circuit having a latch circuit. At a time point of the voltage pumping operation is finished, the final stage clock signal can be latched according to the latch enable signal, and no more un-necessary clock be fed to the charge pump units, and a voltage level of the output voltage can be kept on smooth, and output ripple and peak current can be reduced of the charge pump circuit.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Figure 1:
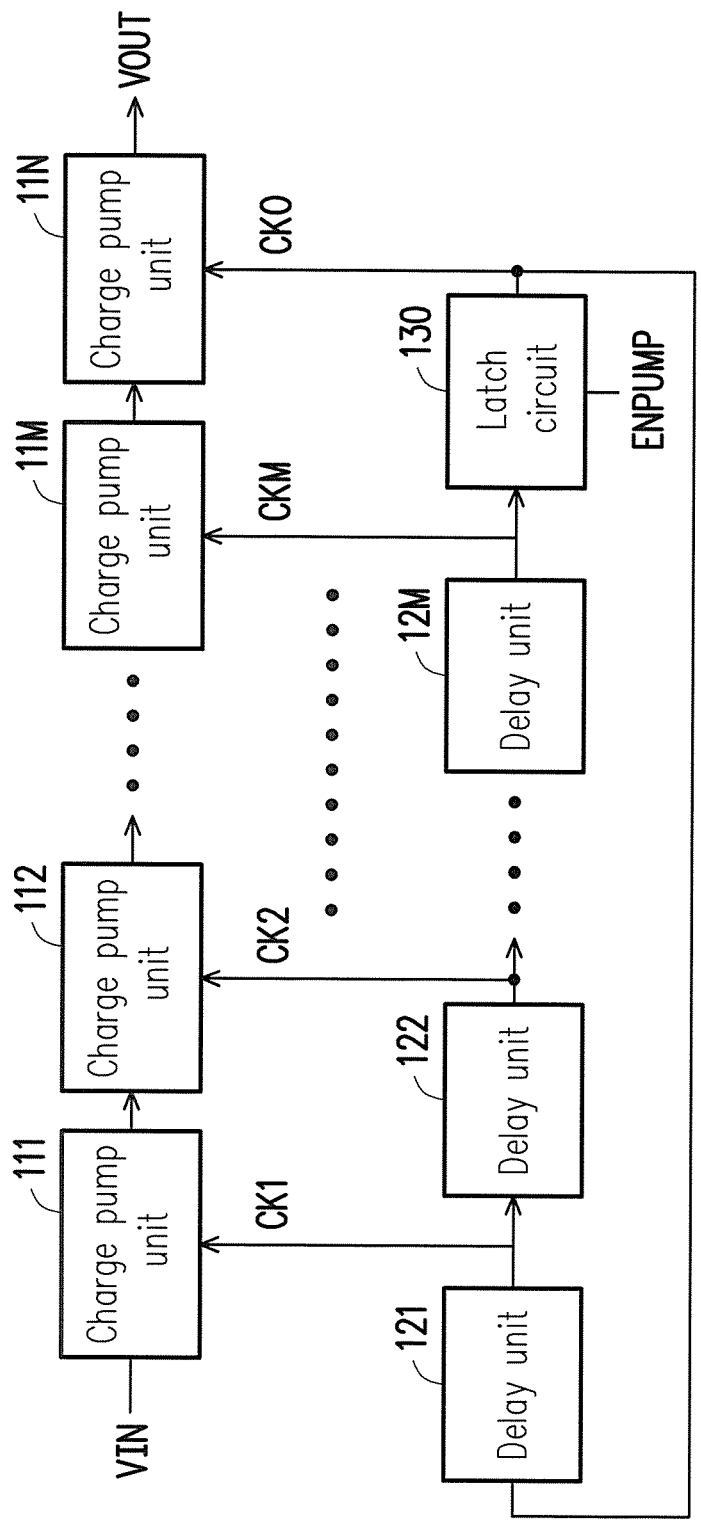
FIG. 1 illustrates a schematic diagram of a charge pump circuit according to an embodiment of present disclosure.

Please referring to FIG. 1, FIG. 1 illustrates a schematic diagram of a charge pump circuit according to an embodiment of present disclosure. The charge pump circuit 100 includes charge pump units 111-11N, delay units 121-12M and a latch circuit 130. The delay units 121-12M are coupled in series, and the delay units 121-12M respectively generate a plurality of clock signals CK1-CKM according to an output clock signal CKO. The charge pump units 111-11N are coupled in series.

In detail, the first stage charge pump unit 111 receive an input voltage VIN, and operates the voltage pumping operation on the input voltage VIN. The voltage pumping result of the first stage charge pump unit 111 is transmitted to the next stage charge pump unit 112 for another voltage pumping operation. In this embodiment, by the voltage pumping operation operating by the charge pump unit 111-11N, an output voltage VOUT with a higher voltage level than the input voltage VIN can be generated. Further, the delay units 121-12M respectively generate the clock signals CK1-CKM by delaying the output clock signal CKO in sequence. For example, the first stage delay unit 121 receives the output clock signal CKO and delays the output clock signal CKO to generate the clock signal CK1. Then, the delay unit 122 receives the clock signal CK1 from the delay unit 121, and generates the clock signal CK2 by delaying the clock signals CK1.

The latch circuit 130 is coupled to the final stage delay unit 12M, and the latch circuit 130 receives the final stage clock signal CKM and generates the output clock signal CKO. The latch circuit 130 further receives the latch enable signal ENPUMP, and latch circuit 130 decides whether to latch the final stage clock signal CKM or not to generate the output clock signal CKO according to the latch enable signal ENPUMP. In detail, the latch enable signal ENPUMP is used to indicate whether the voltage pumping operation is finished or not. If the voltage pumping operation is not finished, the latch circuit 130 may delay the final stage clock signal CKM and pass the delayed final stage clock signal to generate the output clock signal CKO according to the latch enable signal ENPUMP. On the other hand, if the voltage pumping operation is finished, the latch circuit 130 may latch the final stage clock signal CKM to generate the output clock signal CKO according to the latch enable signal ENPUMP, and a voltage level of the output clock signal CKO can be held, and no voltage transition on the output clock signal CKO can be happened.

That is, the voltage level of the output clock signal CKO can be locked simultaneously at the time point when the latch enable signal ENPUMP is used to stop the voltage pumping operation. No un-wanted pulse signal on the output clock signal CKO can be transmitted to the charge pump unit 11N, and un-necessary ripple on the output voltage VOUT is reduced.

On the other hand, the pulse signal(s) on the output clock signal CKO generated before the time point of the voltage pumping operation being stopped may be transmitted to the delay unit 121, and the delay units 121-12M can work normally for a short time period when the voltage pumping operation is stopped. Such as that, the charge pump unit 111-11M can work normally for the short time period. Moreover, if the voltage pumping operation need to be restarted, a new pulse signal on the output clock signal CKO can be generated, and the charge pump unit 11N may generate the output voltage VOUT by the voltage pumping operation according to the output clock signal CKO immediately, and voltage drop of the output voltage VOUT can be reduced, and ripple on the output voltage VOUT can be reduced correspondingly.

In this embodiment, delays respectively provided by the delay units 121-12M may be different or same. Each of the delay units 121-12M may be implemented by any circuit structure, such as one or more logic gates.

Each of the charge pump units 111-11N operate the voltage pumping operation according to pulse signals on the clock signal CK1-CKM and output clock signal CKN, respectively.

Figure 2:
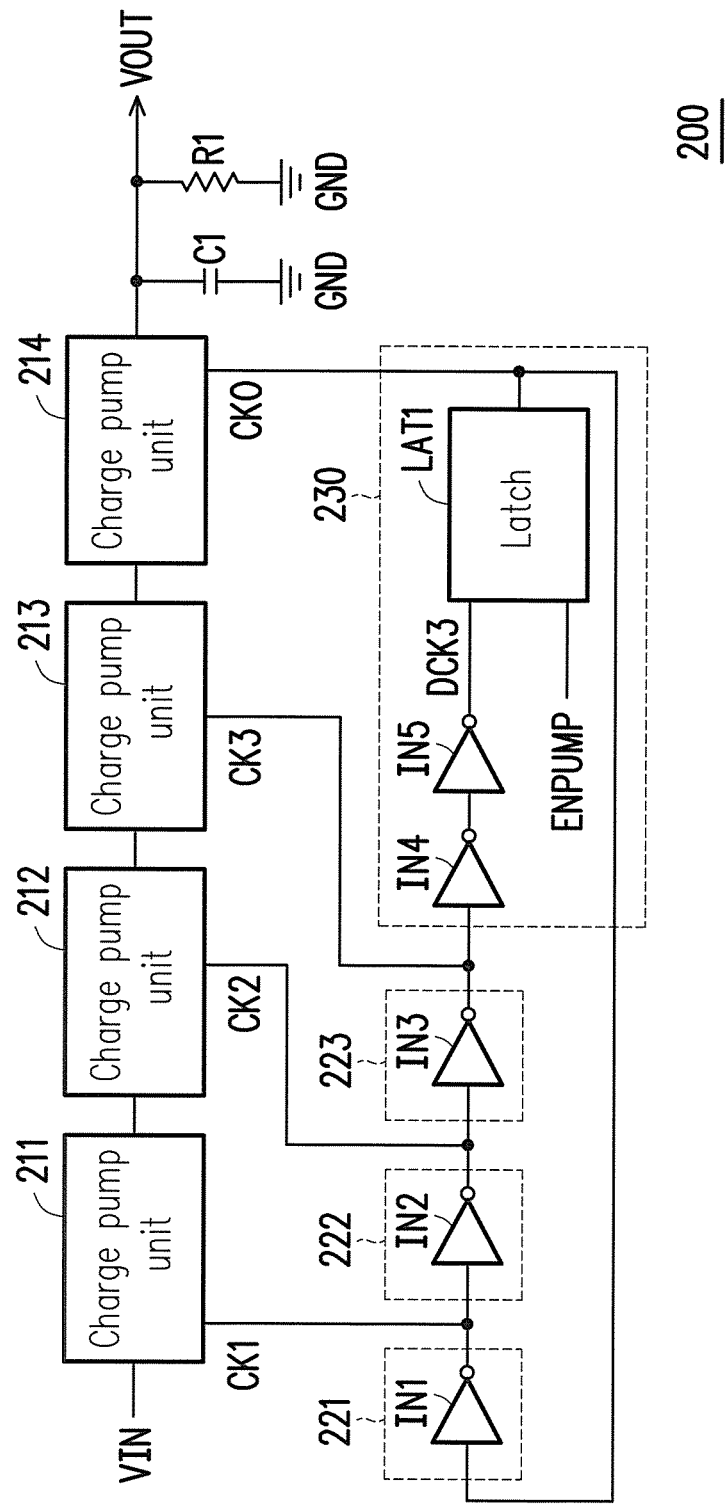
FIG. 2 illustrates a schematic diagram of a charge pump circuit according another embodiment of present disclosure.

Referring to FIG. 2, FIG. 2 illustrates a schematic diagram of a charge pump circuit according another embodiment of present disclosure. The charge pump circuit 200 includes charge pump units 211-214, delay units 221-223 and a latch circuit 230. The delay units 221-223 are coupled in series, and the delay units 221-223 respectively generate a plurality of clock signals CK1-CK3 according to an output clock signal CKO. The charge pump units 211-214 are coupled in series, and respectively receive the clock signals CK1-CK3 and the output clock signal CKO and respectively operate voltage pumping operations according to the receives clock signals.

In this embodiment, the delay units 221-223 respectively include inverters IN1-IN3, and the clock signal CK1 is complementary to the clock signal CK2, and the clock signal CK2 is complementary to the clock signal CK3. The latch circuit 230 includes inverters IN4-IN5 and a latch LAT1. The inverters IN4-IN5 are used to be a delay circuit, and the inverters IN4-IN5 delay the received clock signal CK3 to generate a delayed clock signal DCK3. The delayed clock signal DCK3 is received by the latch LAT1, and the latch LAT1 further receives the latch enable signal ENPUMP and generates the output clock signal CKO.

It should be noted here, the latch LAT1 may be a logic latch gate, and the latch LAT1 may pass the delayed clock signal DCK3 to be the output clock signal CKO when the latch enable signal ENPUMP is in a first logic level, and the latch LAT1 may latch the voltage level of the delayed clock signal DCK3 to generate the output clock signal CKO when the latch enable signal ENPUMP is in a second logic level.

The final stage charge pump unit 214 is also coupled to a resistor R1 and a capacitor C1. The resistor R1 is coupled between an output end of the charge pump unit 214 and a reference ground GND. The capacitor C1 is coupled between the output end of the charge pump unit 214 and a reference ground GND. The resistor R1 and the capacitor C1 may be a circuit for eliminating ripples on the output voltage VOUT.

Figure 3:
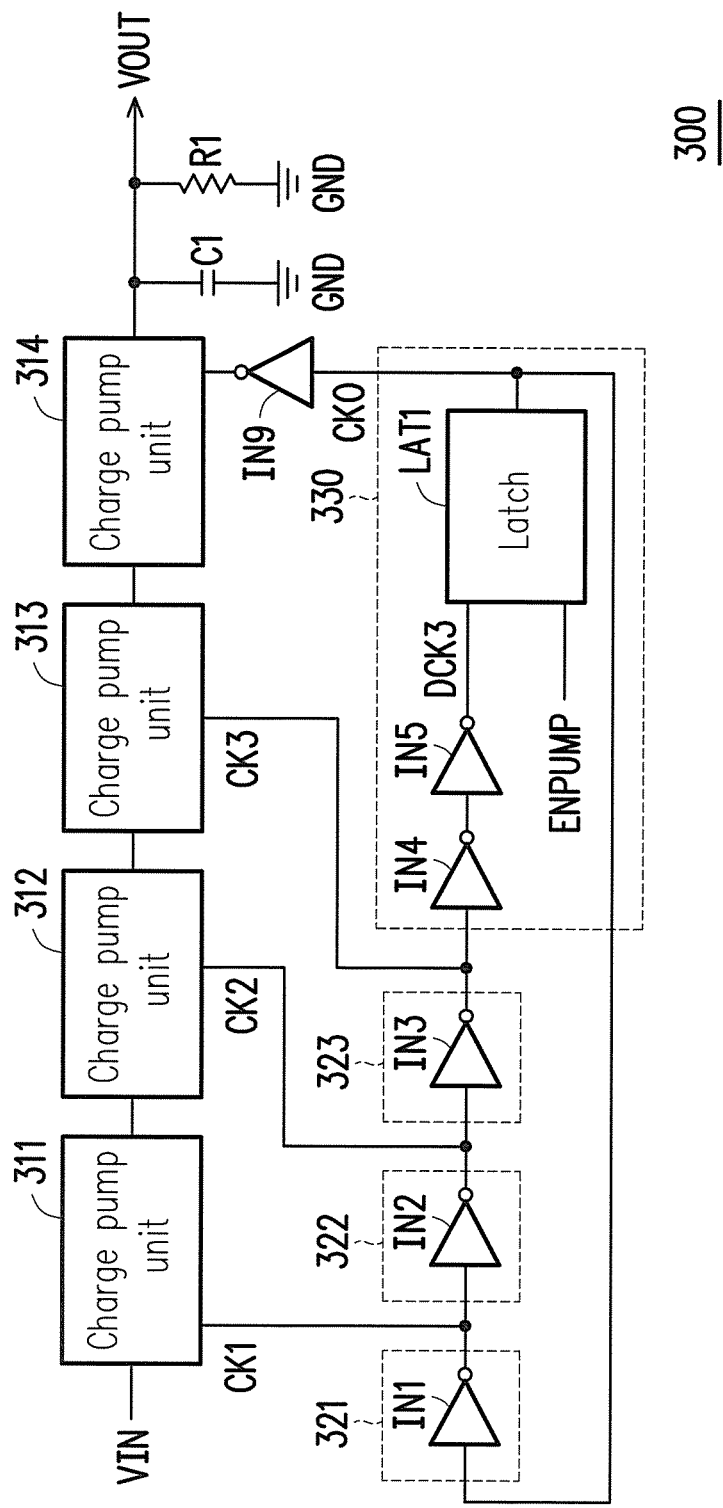
FIG. 3 illustrates a schematic diagram of a charge pump circuit according further another embodiment of present disclosure.

Referring to FIG. 3, FIG. 3 illustrates a schematic diagram of a charge pump circuit according further another embodiment of present disclosure. The charge pump circuit 300 includes charge pump units 311-314, delay units 321-323, a latch circuit 330 and an inverter IN9. In this embodiment, the circuit structures of all of the charge pump units 311-314 may be the same, and the clock signal CK1 is complementary to the clock signal CK2, the clock signal CK2 is complementary to the clock signal CK3, and the clock signal CK3 is complementary to the output clock signal CKO.

Figure 4:
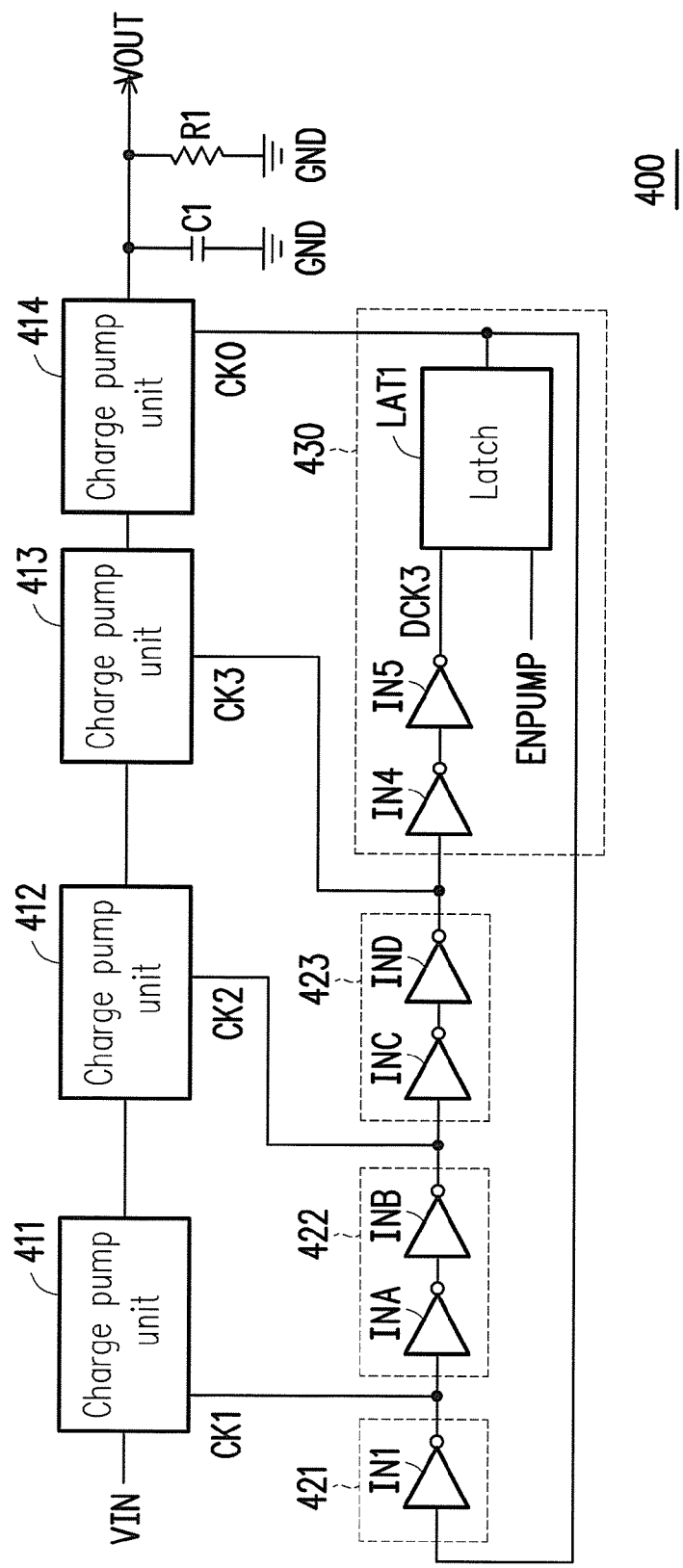
FIG. 4 illustrates a schematic diagram of a charge pump circuit according further another embodiment of present disclosure.

Referring to FIG. 4, FIG. 4 illustrates a schematic diagram of a charge pump circuit according further another embodiment of present disclosure. The charge pump circuit 400 includes charge pump units 411-414, delay units 421-423, and a latch circuit 430. In this embodiment, numbers of inverter in the delay units 421-423 may be different. For example, the delay unit 421 includes merely one inverter IN1. The delay unit 422 includes two inverters INA and INB, and the delay unit 423 includes two inverters INC and IND. It can be easily seen, the clock signal CK1 is not complementary to the clock signal CK2, the clock signal CK2 is not complementary to the clock signal CK3, and the clock signal CK3 is not complementary to the output clock signal CKO.

Figure 5:
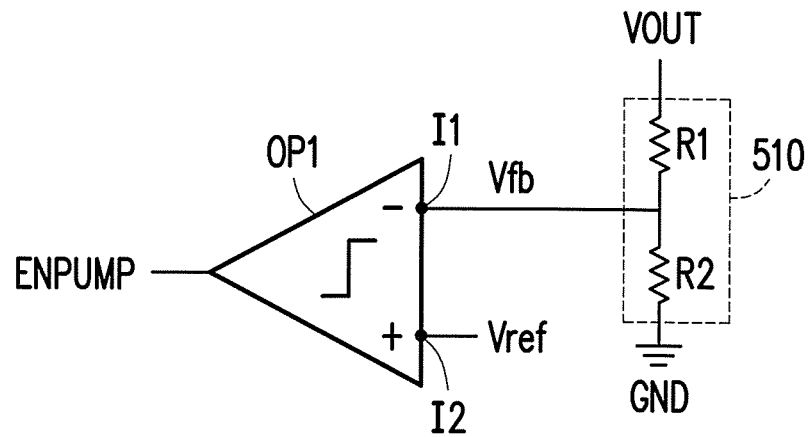
FIG. 5 illustrating a schematic diagram of a regulating circuit according to an embodiment of present disclosure.

Referring to FIG. 5, FIG. 5 illustrating a schematic diagram of a regulating circuit according to an embodiment of present disclosure. The regulating circuit 500 receives the output voltage VOUT which may be generated by the charge pump circuits 100, 200, 300 or 400, and the regulating circuit 500 is used to generate the latch enable signal ENPUMP. In detail, the regulating circuit 500 includes a voltage divider 510 and an operation amplifier OP1. The voltage divider 510 receives the output voltage VOUT and divides the output voltage VOUT to generate a feedback voltage Vfb. The voltage divider 510 includes two resistors R1 and R2. The resistors R1 and R2 are coupled in series, and one end of the resistor R1 receives the output voltage VOUT, another end of the resistor R1 is coupled to one end of the resistor R2, and another end of the resistor R2 is coupled to the reference ground GND.

On the other hand, the operation amplifier OP1 has a positive input end I2 and a negative input end I1. The positive input end I2 receives a reference voltage Vref, and the negative input end I1 receives the feedback voltage Vfb. The operation amplifier OP1 compares the reference voltage Vref and the feedback voltage Vfb to generate the latch enable signal ENPUMP. In this embodiment, if the reference voltage Vref is larger than the feedback voltage Vfb, the voltage pumping operation can't be stopped, and the operation amplifier OP1 generates the latch enable signal ENPUMP with logic level "1". On the contrary, if the reference voltage Vref is smaller than the feedback voltage Vfb, the voltage pumping operation should be stopped, and the operation amplifier OP1 generates the latch enable signal ENPUMP with logic level "0".

Figure 6:
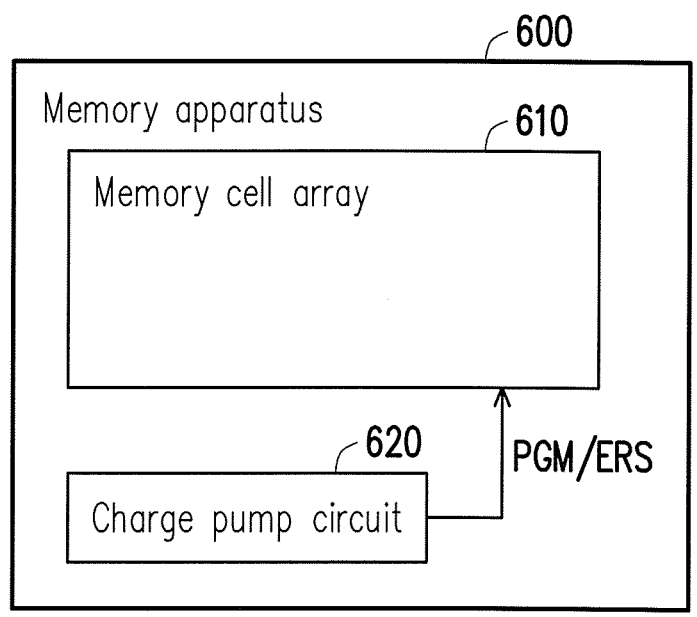
FIG. 6 illustrates a block diagram of memory apparatus according to an embodiment of present disclosure.

Referring to FIG. 6, FIG. 6 illustrates a block diagram of memory apparatus according to an embodiment of present disclosure. The memory apparatus 600 includes a plurality memory cells, and the memory cells are arranged in a memory cell array 610. The memory apparatus 600 further includes a charge pump circuit 620. The memory cells in the memory cell array 610 may be non-volatile memory cells. The charge pump circuit 620 may be implemented by the charge pump circuit 100, 200, 300 or 400, and the charge pump circuit 620 is used to provide one or both of an erasing voltage ERS and a programming voltage PGM.

Figure 7:
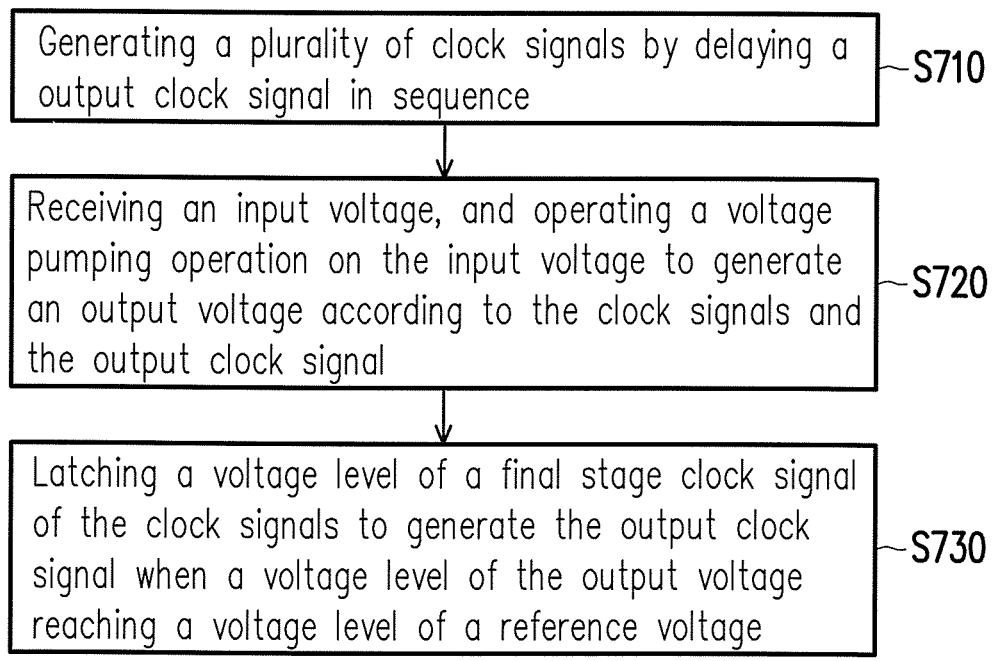
FIG. 7 illustrates a flow chart of a voltage pumping method according to an embodiment of present disclosure.

Referring to FIG. 7, FIG. 7 illustrates a flow chart of a voltage pumping method according to an embodiment of present disclosure. In the step S710, a plurality of clock signals are generated by delaying an output clock signal in sequence. Then, in the step S720, an input voltage is received, and a voltage pumping operation is operated on the input voltage and an output voltage is generated correspondingly according to the clock signals and the output clock signal. Further, in the step S730, a voltage level of a final stage clock signal of the clock signals is latched to generate the output clock signal when a voltage level of the output voltage reaching a voltage level of a reference voltage. That is, when the voltage level of the output voltage reaching the voltage level of the reference voltage, the voltage level of the output clock signal is latched, and no more pulse signal transmitted to the final stage charge pump unit. Ripple on the output voltage can be reduce, and peak current generated by the charge pump circuit can be reduced, too.

Detail operations about each of the steps S710-730 have been described in above embodiments. There is no more repeatedly descriptions here.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A charge pump circuit, comprising:
    a plurality of delay units coupled in series, wherein the delay units respectively generate a plurality clock signals by delaying an output clock signal in sequence;
    a latch circuit, coupled to the delay units, receiving a final stage clock signal of the clock signals generated by the delay units and receiving a latch enable signal, wherein the latch circuit decides whether to latch the final stage clock signal or not to generate the output clock signal according to the latch enable signal; and
    a plurality of charge pump units are coupled in series, wherein a first stage of the charge pump unit receives an input voltage, and the charge pump units operate a voltage pumping operation on the input voltage to generate an output voltage according to the clock signals and the output clock signal.

2. The charge pump circuit as claimed in claim 1, wherein one of the delay units comprises:
    at least one inverter, having an input end coupled to an output end of a previous stage delay unit, and an output end coupled to an input end of a next stage delay unit.

3. The charge pump circuit as claimed in claim 1, wherein the latch circuit comprises:
    a delay circuit, receiving the final stage clock signal and generating a delayed clock signal; and
    a latch, receiving the delayed clock signal and the latch enable signal, and deciding whether to hold a voltage level of the delayed clock signal or not according to the latch enable signal.

4. The charge pump circuit as claimed in claim 1, further comprising:
    a regulating circuit, coupled to the pump units and the latch circuit, receiving the output voltage and comparing the output voltage with a reference voltage to generate the latch enable signal.

5. The charge pump circuit as claimed in claim 4, wherein the regulating circuit comprises:
    a voltage divider, receiving the output voltage and dividing the output voltage to generate an feedback voltage; and
    an operation amplifier, having a negative input end receiving the feedback voltage, a positive input end receiving the reference voltage, and an output end for generating the latch enable signal.

6. A memory apparatus, comprising:
    a charge pump circuit, providing at least one of a programming voltage and an erasing voltage to a plurality of memory cell of the memory apparatus, wherein the charge pump circuit comprises:

a plurality of delay units coupled in series, wherein the delay units respectively generate a plurality clock signals by delaying an output clock signal in sequence;

a latch circuit, coupled to the delay units, receiving a final stage clock signal of the clock signals generated by the delay units and receiving a latch enable signal, wherein the latch circuit decides to whether to latch the final stage clock signal or not to generate the output clock signal according to the latch enable signal; and a plurality of charge pump units are coupled in series, wherein a first stage of the charge pump unit receives an input voltage, and the charge pump units operate a voltage pumping operation on the input voltage to generate an output voltage according to the clock signals and the output clock signal, wherein the output voltage is used to be at least one of the programming voltage and the erasing voltage.

7. The memory apparatus as claimed in claim 6, wherein one of the delay units comprises:

at least one inverter, having an input end coupled to an output end of a previous stage delay unit, and an output end coupled to an input end of a next stage delay unit.

8. The memory apparatus as claimed in claim 6, wherein the latch circuit comprises:

a delay circuit, receiving the final stage clock signal and generating a delayed clock signal; and a latch, receiving the delayed clock signal and the latch enable signal, and deciding whether to hold a voltage level of the delayed clock signal or not according to the latch enable signal.

9. The memory apparatus as claimed in claim 6, wherein the charge pump circuit further comprises:

a regulating circuit, coupled to the pump units and the latch circuit, receiving the output voltage and comparing the output voltage with a reference voltage to generate the latch enable signal.

10. The memory apparatus as claimed in claim 6, wherein the regulating circuit comprises:

a voltage divider, receiving the output voltage and dividing the output voltage to generate an feedback voltage; and a operation amplifier, having a negative input end receiving the feedback voltage, a positive input end receiving the reference voltage, and an output end for generating the latch enable signal.

11. A voltage pumping method, comprising:

generating a plurality of clock signals by delaying an output clock signal in sequence by a plurality of delay units;

latching a voltage level of a final stage clock signal of the clock signals generated by the delay units to generate the output clock signal when a voltage level of an output voltage reaching a voltage level of a reference voltage;

receiving an input voltage, and operating a voltage pumping operation on the input voltage to generate the output voltage according to the clock signals and the output clock signal.

12. The voltage pumping method as claimed in claim 11, further comprising:

delaying the final stage clock signal to generate the output clock signal, when the voltage level is smaller than the voltage level of the reference voltage.

13. The voltage pumping method as claimed in claim 11, wherein step of latching the voltage level of the final stage clock signal of the clock signals to generate the output clock signal when the voltage level of the output voltage reaching the voltage level of the reference voltage comprises:

comparing the voltage level of the output voltage and the voltage level of the reference voltage to generate a latch enable signal; and latching the voltage level of the final stage clock signal of the clock signals to generate the output clock signal according to the latch enable signal.

14. The voltage pumping method as claimed in claim 12, wherein step of comparing the voltage level of the output voltage and the voltage level of the reference voltage to generate the latch enable signal comprises:

dividing the output voltage to generate a feedback voltage; and comparing the feedback voltage and the reference voltage to generate the latch enable signal.

* * * * *